US008694044B2

United States Patent
Hiltunen et al.

(10) Patent No.: US 8,694,044 B2
(45) Date of Patent: Apr. 8, 2014

(54) DYNAMIC POWER CONTROL OF USER EQUIPMENT

(75) Inventors: Kimmo Hiltunen, Esbo (FI); Tomas Nylander, Värmdö (SE); Håkan Olofsson, Stockholm (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 821 days.

(21) Appl. No.: 12/934,225

(22) PCT Filed: Aug. 22, 2008

(86) PCT No.: PCT/SE2008/050952
§ 371 (c)(1),
(2), (4) Date: Sep. 23, 2010

(87) PCT Pub. No.: WO2009/120121
PCT Pub. Date: Oct. 1, 2009

(65) Prior Publication Data
US 2011/0021240 A1   Jan. 27, 2011

Related U.S. Application Data

(60) Provisional application No. 61/039,123, filed on Mar. 25, 2008.

(51) Int. Cl.
*H04B 7/00* (2006.01)
(52) U.S. Cl.
USPC ............. 455/522; 455/69; 455/442; 370/318
(58) Field of Classification Search
USPC ............................ 455/69, 442, 522; 370/318
See application file for complete search history.

(56) References Cited

U.S. PATENT DOCUMENTS

| 7,738,907 B2* | 6/2010 | Xiao et al. ................ 455/522 |
| 2003/0199275 A1 | 10/2003 | Sakoda et al. |
| 2008/0254804 A1* | 10/2008 | Lohr et al. ................ 455/442 |

FOREIGN PATENT DOCUMENTS

WO   2007/097672 A   8/2007

OTHER PUBLICATIONS

PCT International Search Report, mailed Apr. 2, 2009, in connection with International Application No. PCT/SE2008/050952.
International Preliminary Report on Patentability, dated Jun. 18, 2010, in connection with International Application No. PCT/SE2008/050952.

* cited by examiner

*Primary Examiner* — Raymond Dean
(74) *Attorney, Agent, or Firm* — Potomac Patent Group PLLC

(57) ABSTRACT

A first communication device and a method in a node serving a first cell of a first frequency for controlling transmission power of a user equipment in the first cell, comprising receiving data relating to a second cell of the first frequency from the user equipment and determining to power regulate the user equipment. Determining to power regulate the user equipment is based on determining that the second cell is a cell to which a soft handover cannot be performed and determining that the user equipment is within a range of a cell border of the first cell. That being the case, the method further comprises transmitting a control message to the user equipment to control the transmission power of the user equipment.

24 Claims, 5 Drawing Sheets

DYNAMIC POWER CONTROL OF USER EQUIPMENT

TECHNICAL FIELD

The present invention relates a method and a device in a communication network, in particular, for controlling transmission power of a user equipment.

BACKGROUND

Work is ongoing in 3GPP, $3^{rd}$ Generation Partnership Project, and with some operators to specify and investigate the possibility to provide home and/or small area coverage for a limited number of users using a small base station, commonly called a Femto NodeB for WCDMA, Wideband Code Division Multiple Access, or Femto eNodeB (E-UTRAN (Evolved-UMTS Terrestrial Radio Access Network) NodeB) for LTE, Long Term Evolution. Other commonly used names are HNB (Home NodeB) for WCDMA and HeNB (Home eNodeB) for LTE. The femto solutions based on WCDMA technology are called WCDMA Femto solutions and the solutions based on LTE technology are called LTE Femto solutions. Similar solutions can also be deployed for other radio technologies, like GSM. In this application, the name Femto NodeB is used as an exemplary name for the small base station and should not be read to limit the scope only to WCDMA Femto solutions. In the same way, the term Macro NodeB is used as an exemplary name for any traditional base station using any technology. The Femto NodeB would provide normal LTE/WCDMA/GSM coverage for the end users, a so called femto cell, and would be connected to the mobile operator's network using some kind of IP based transmission. One example is to use fixed broadband access (e.g. xDSL or Cable) to connect the Femto node to the mobile operator's network. Another alternative would be to use Mobile Broadband access, for example, High Speed Downlink Packet Access, HSDPA, and Enhanced Uplink.

There are several ways to use the available radio frequencies between the femto layer and the traditional cellular deployment layer, referred to as 'macro' layer even though it may comprise both macro, micro and/or pico cells. There are three main Channel Deployment Scenarios (CDS) that are relevant, namely:
CDS1: One frequency is used by both the Femto NodeBs and the Macro NodeBs. This CDS has some severe interference problems that will make it hard to work.
CDS2: One dedicated frequency is used only by the Femto NodeBs and (at least) another frequency is used only by the Macro NodeBs. This CDS is the preferred one if only technical arguments are taken into account. However, it is very unlikely that operators are willing to dedicate whole frequencies for the femto layer, mostly due to economical reasons.
CDS3: One frequency used both by the Femto NodeBs and the Macro NodeBs and (at least) another frequency used only by the Macro NodeBs.

CDS3 is expected to be a common way for deployments. This deployment scenario may as well as CDS1 cause different types of interference in certain scenarios, both between the femto and the macro layer and internally in the femto layer as it is assumed that all the Femto NodeBs belonging to one operator are using the same carrier/frequency.

A number (a few) Primary Scrambling Codes (PSC) is allocated to the femto layer, e.g. ten. These PSCs are configured in the cell neighbor lists on the macro layer, and signaled to macro layer user equipments, UEs, for their idle mode cell selection. One of these PSCs is automatically assigned to each Femto NodeB at start up.

A number (a few) Location Areas (LA) is also allocated to the femto layer, e.g. ten. One of these is automatically assigned to each Femto NodeB at start up.

A Femto NodeB scans and reports found cells (both macro and femto cells) to a Radio Network Controller, RNC. The RNC may be a standalone entity or combined with the Femto NodeB. The reported data includes for each detected cell:
1. PSC,
2. frequency, i.e. UTRA Absolute Radio Frequency Channel Number, UARFCN,
3. relevant parts of system information (e.g. Location area identifier, LAI, Routing area code RAC, Cell-ID, primary common pilot channel CPICH transmission power) and
4. signal strength measurement report.

The RNC builds the neighbor list for a Femto NodeB, and includes the heard macro cells and the allocated femto PSCs in the neighbor list. The list is signaled both to UEs camping on the femto cell of Femto NodeB as broadcasted system information for use in cell selection/reselection and to UEs connected to the Femto NodeB as dedicated signaling in the form of Monitored Set for use in measurement reporting for possible handover.

Femto NodeB 'access control' may for example be based on a forbidden LAI list in the UE (i.e. LAI list in UE updated with the use of Location Update Reject).

By using frequency deployment scenario CDS3, as well as by using CDS1, it is possible that different types of interference are created when a UE camped on a femto cell of a first frequency moving towards a neighboring cell.

US2003199275 discloses a mobile station that decides to adjust transmission power.

SUMMARY

Embodiments provide the means to reduce interference between equipment in different cells of the same frequency.

Embodiments disclose a method in a radio base station or radio base station controller serving a first cell of a first frequency for controlling transmission power of a user equipment in the first cell. The method comprises to receive data relating to a second cell of the first frequency from the user equipment and to determine to power regulate the user equipment. The determination is done by determining that the second cell is a cell to which a soft handover cannot be performed and determining that the user equipment is within a range of a cell border of the first cell. If it is determined to power regulate the user equipment the method comprises to transmit a control message to the user equipment to control the transmission power of the user equipment.

Furthermore, embodiments disclose a radio base station or radio base station controller arranged to serve a first cell of a first frequency comprising a receiving arrangement adapted to receive data relating to a second cell of the first frequency from a user equipment. The first communication device further comprises a control unit arranged to determine to power regulate the user equipment based on predetermined requirements, being that the second cell is a cell to which a soft handover cannot be performed, and that the user equipment is within a range of a cell border of the first cell. That being the case, the control unit is further arranged to generate a control message to control the transmission power of the user equipment. The first communication device additionally comprises a transmitting arrangement adapted to transmit the control message to the user equipment.

It will be possible to minimize uplink interference from Femto UEs towards neighboring cells in an effective way since only the users that are causing the problems are controlled, i.e. the ones close to the cell border.

BRIEF DESCRIPTION OF THE DRAWINGS

Embodiments will now be described in more detail in relation to the enclosed drawings, in which.

DETAILED DESCRIPTION OF EMBODIMENTS

Figure 1:
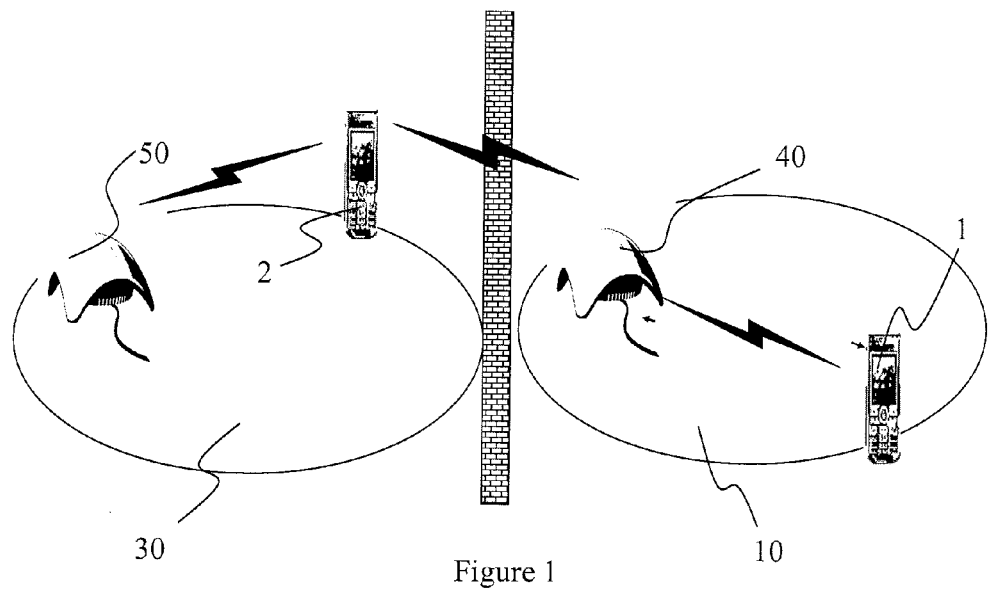
FIG. 1 shows a schematic overview of a communication system comprising two femto cells.

The present invention will now be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout the whole description.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system.

In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, "electronic component" means an active device as contrasted with a passive electrical connector or the like. An electronic component may include a processor.

As used herein, a "user equipment" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another user equipment.

The user equipment may be configured to communicate over a wireless interface, a so called "wireless communication terminal" or a "wireless terminal". Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

In the following text 'RNC', Radio Network Controller, should be read as a logical entity that either is a standalone entity or combined with a Femto NodeB. The term "femto RNC" is used in this application to describe an RNC to which Femto NodeBs are connected. The same term is also used to describe any other central node (for example, a "femto Operation and maintenance node") that is part of the automatic installation procedure. It is also used in the case when the RNC is combined with a Femto NodeB. Furthermore, the "Femto RNC" entity could also be a part of an RNC controlling also Macro NodeBs.

The illustrated solution is based on WCDMA femto, but may also apply to LTE femto, GSM femto solutions as well as to other technologies utilizing base stations from which no soft handover is allowed.

In FIG. 1 a schematic overview of two femto cells 10, 30 provided by a first Femto Node B 40 and a second Femto NodeB 50 is shown. The two Femto cells 10, 30 are operating on the same frequency and are deployed in the vicinity of each other but are necessarily not close enough to detect/hear each other. Two Femto UEs 1, 2 are active in their respective Femto cell, i.e. Femto UE 1 in Femto cell 10 and Femto UE 2 in Femto cell 30. When Femto UE 2 gets close to its femto cell border, UE 2 will increase the transmission power in order to maintain the bit rate and this will cause increased uplink interference towards the femto cell 10, reducing the uplink performance of femto cell 10.

In a network without femto cells, the serving RNC controlling the source cell would try to perform soft handover if measurement reports from the UE indicate a better serving cell, i.e. to add a leg to the new base station controlling the detected cell. However, handover would normally not be allowed between femto cells as they normally would belong to different end users (as in this case) and access control would prevent a neighbor to use a neighbor's femto.

In order to reduce the interference, the Femto NodeB 50 orders the Femto UE 2 to reduce its transmission power.

Figure 2:
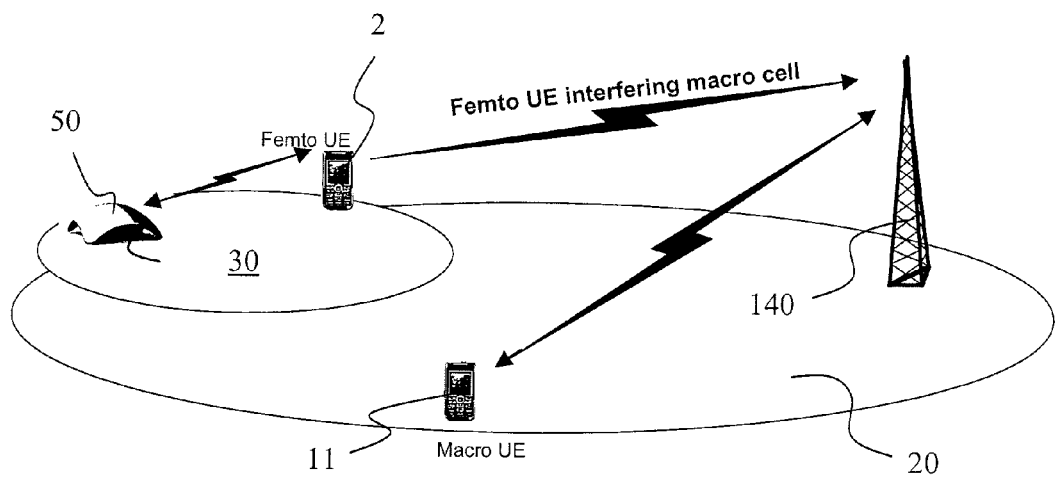
FIG. 2 shows a schematic overview of interference between equipment in a femto cell and a macro cell.

In FIG. 2 a schematic overview of a Femto UE 2 in a Femto cell 30 operating within a macro cell 20 is shown.

The Femto UE 2 is active on 'his/her' femto cell 30 of a Femto NodeB 50 and a Macro UE 11 is in active/connected mode in the macro cell 20 of a base station 140 on the same frequency as the femto cell 30. When Femto UE 2 gets close to the femto cell border it will increase the transmission power in order to maintain the bit rate, this will cause uplink interference towards the macro cell 20, reducing the uplink performance of macro cell 20. Again, in a network without femtos, the way to combat the interference would be to increase the active set to include the macrocell, thereby enabling power control of the UE power versus both the serving and the target/victim cell. However, femto/macro soft handover is typically not supported as the legs would likely be connected to different RNCs or in the case of the discussed flat architecture, i.e. Collapsed NodeB and RNC there wouldn't be any common point in the network that can enable soft handover.

In a flat architecture the soft handover would be enabled by communication between combined NodeB/RNC's using the Iur interface, however in a scenario with Femto NodeBs, no communication possibilities are foreseen between a Femto NodeB and a Macro NodeB due to a number of reasons. One reason is that potentially very large numbers of Iur communication links from a lot of Femto NodeBs would need to be established to a Macro NodeB.

Another reason to avoid soft handover between femto and macro is to keep the number of connections towards the macro cell (soft handover overhead) sufficiently low. By doing so, the macro cell downlink will not be unnecessarily loaded by the (possibly large amounts of) Femto UEs.

Furthermore, there are some additional problems related to femto cells and soft handover. The total number of different WCDMA Primary Scrambling Codes (PSC) is limited to 512. As the number of femto cells in a network is estimated from tens of thousands up to millions, there is even wider reuse need of PSCs in the femto layer, than in the macro layer. One working assumption is that a limited number of PSCs, for example five to ten, is dedicated for the femto layer and reused between the different femto cells. These PSCs are normally not defined in the femto cells as "idle or active mode neighbor cells".

The high number of the femto cells and the fact that these may be installed by the end users themselves without any intervention or planning by the operator personnel means that it is not possible to uniquely identify a femto cell. If the UEs would start including the femto cells in the active/connected mode measurement reports (i.e. that the femto cells are also added to the Monitored Set in other femto cells), it would still be impossible for the serving RNC to uniquely identify the correct femto cell to trigger e.g. soft handover signaling towards that RNC and cell. For this reason, it is not very likely that the femto cells are included in the active/connected mode neighbor cell lists of the femto cells.

Additional measures are needed to enable, or more correctly to increase the likelihood, that a femto cell is identified correctly by the Serving RNC. Soft Handover between femto base stations is not easy to achieve. One solution would require a dynamic building of UE-specific neighbor cell lists, and that these lists are built based on subscriber specific information. This information is not available in the (Femto) RNC and would require interaction with a database function in real time. This means that such a function would mean substantial impact on the system.

As mentioned, the lack of soft handover will increase the uplink interference towards the macro cell, indicating a possible need to implement some special uplink interference mitigation techniques into the Femto NodeB. Such techniques include for example limitation of the Femto UE transmission powers within the femto cell, e.g. by explicitly signaling the maximum allowed transmission power to the Femto UE or by limiting the maximum uplink bit rates, and the limitation of the size of the femto cell, e.g. by changing the handover parameter settings or by reducing the Femto NodeB P-CPICH transmission power. These techniques, however, result in a reduced performance of the Femto UEs, reduced femto coverage area, as well as the increased uplink interference towards the Femto NodeB from close-by macro UEs.

Embodiments described herein introduce a third alternative to reduce uplink interference towards neighboring cells without hurting the performance of femto cell too much. This is done by building on the limitation of the maximum Femto UE transmission power, but instead of applying the same limit for all Femto UE locations, the transmission power limitation is applied only when needed, e.g. in scenarios where the Femto UE would generate too much uplink interference towards neighboring NodeBs.

Referring back to FIG. 2, the Femto NodeB 50 of the femto cell 30 senses that the UE 2 is close a cell border as well as a second cell 20 to which no soft handover is possible. The base station 50 then performs a power regulation on the UE 2 by transmitting orders to the UE 2 to reduce the maximum allowed transmission power to a determined threshold value.

Figure 3:
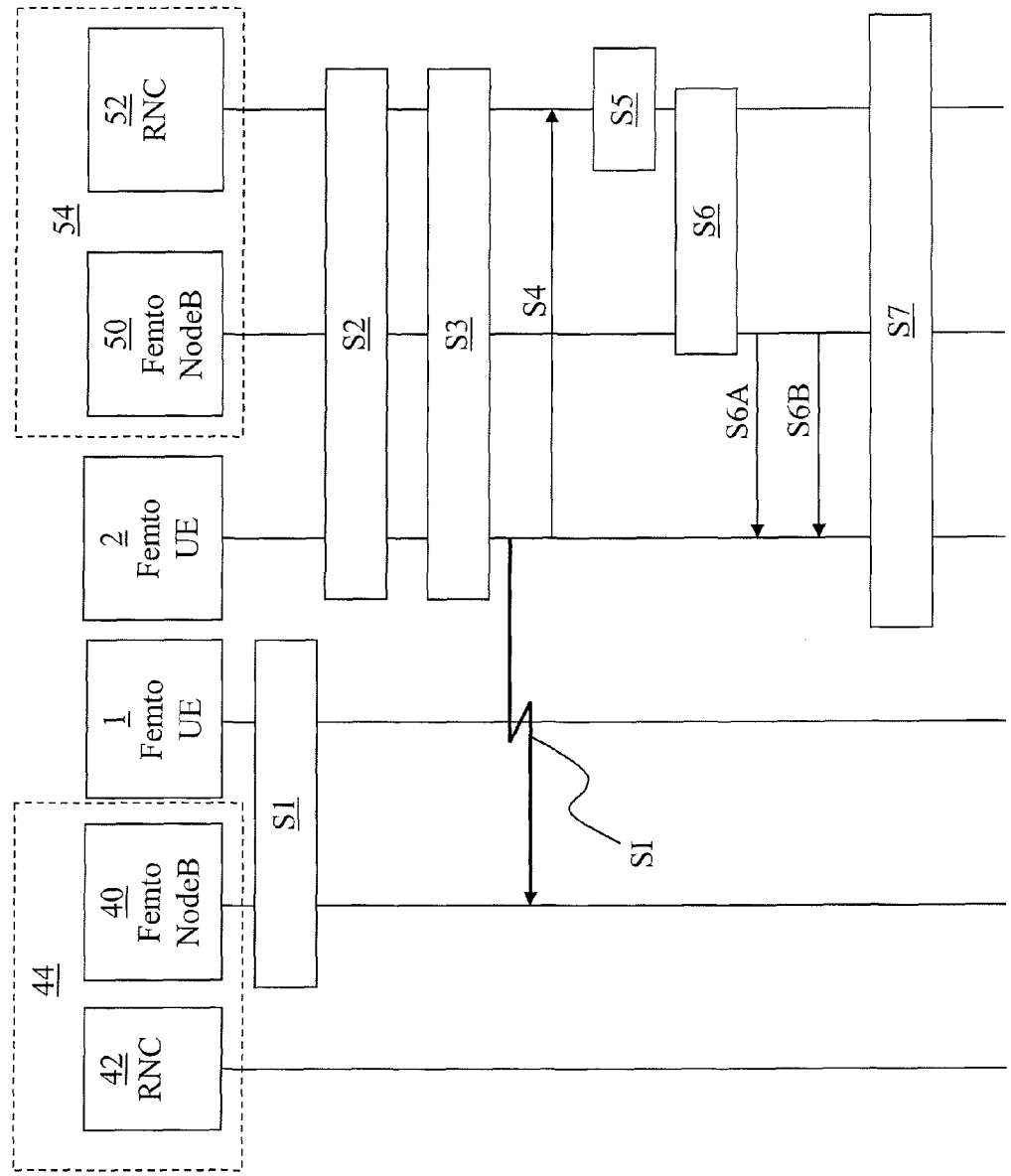
FIG. 3 shows a schematic combined signal and method diagram of a first and second Femto UE.

In FIG. 3, a combined signal and method diagram of a first and a second Femto UE 1, 2 in a system according to FIG. 1 is shown.

In the example of FIG. 3, the relevant femto cells may be allocated frequency 1 and PSC 200 and 400. It should be noted that also other PSCs may be allocated for the femto layer and reused between the different femto cells. However, all the femto cells are probably using the same frequency, i.e. frequency 1. The Femto NodeBs/RNCs 40,50,42,52 are configured to include the PSCs allocated to the femto layer in the active/connected mode neighbor cell list (i.e. in the Monitored Set).

In step S1, the Femto UE 1 is engaged in session in a femto cell 10 of a Femto NodeB 40 on frequency 1 and with PSC 200.

In step S2, the Femto UE 2 is engaged in an active session on frequency 1 with PSC 400 in a femto cell 30 of a Femto NodeB 50. All femto cells with PSC 200 are configured as part of the Monitored Set for the Femto UE 2, i.e. it is not possible to uniquely identify a femto cell only based on the (reused) PSC.

In step S3, the Femto UE 2 gets close to the cell border and into the vicinity of the neighbor femto cell 10 and interference SI is a fact.

In step S4, the Femto UE 2 sends a measurement report of the neighbor femto cell 10 operating on PSC 200 to the Femto NodeB 50. This kind of reports may have been sent earlier as well and this actual report may be assumed to be the trigger for the power regulation, i.e. a threshold of the signal strength of the femto cell 10 is reached. It should here be noted that the femto NodeB 50 and RNC 52 may be a combined femto access point 54 comprising a base station and a controller unit. The same is illustrated for femto cell 10 with a combined NodeB 40 and RNC 42, denoted as 44.

In step S5, the Serving femto RNC 52 receives the measurement report from the Femto UE 2 and notices that the Femto UE 2 is close to a cell using a PSC, e.g. PSC 200, used only by femto cells. The Femto RNC 52 thus knows that the reported cell is a femto cell and that it is not possible to perform (soft) handover.

The network, i.e. the Femto NodeB/RNC 50,52 estimates the level of uplink interference generated by Femto UE 2 at femto cell 10. If the network judges that this interference is too high, it orders Femto UE 2 to reduce its maximum transmission power to decrease the interference towards femto cell 10. Similarly, if the network judges that the uplink interference is sufficiently low, it may allow Femto UE 2 to increase its maximum transmission power.

Step S5 may consist of three major sub-steps performed by the network, e.g. Femto NodeB/RNC 50,52:
1. Identify a Femto UE that should be regulated, e.g. Femto UE 2,
2. Estimate a level of uplink interference caused by Femto UE 2 towards the neighboring Femto NodeB 40,
3. Estimate a maximum allowed Femto UE 2 transmission power so that the estimated uplink interference at neighboring Femto NodeB 40 would not exceed the wanted level (threshold).

These sub-steps are discussed in more detail below.

In sub-step 1, the Femto UE 2 is identified as being a UE that should be power regulated.

When the uplink interference towards neighboring cells is considered, the largest contribution comes from the Femto UEs that are close to the (uplink) cell border. There would not be any need to regulate the Femto UEs that are much closer to the serving femto base station than the neighboring NodeB, since their contribution to the total inter-cell interference is minimal. Although the regular UE measurements (P-CPICH RSCP and/or Ec/N0) indicate the location of the (downlink) cell border, this information may be seen as sufficient also for selecting the Femto UEs that need to be regulated in the uplink.

Hence, Femto NodeB/RNC 50,52 may decide to regulate only UEs that report the relative P-CPICH RSCP (RSCPserving/RSCPneighbor) or Ec/N0 to be smaller than a certain threshold D1. Since the UE transmission power and the level of uplink interference may depend on the assumed service, also the value of D1 may be "service-dependent", so that a smaller D1 threshold is allowed for a low bit service, e.g. voice or the like, compared to, e.g. High-Speed Uplink Packet Access, HSUPA, or the like.

In sub-step 2, the level of uplink interference at the neighboring NodeB is estimated.

In order to estimate the level of interference at the neighboring NodeB 40, Femto NodeB 50 needs to obtain an estimate of the (uplink) path loss from the Femto UE 2 towards neighboring NodeB 40. Again, Femto NodeB/RNC 50,52 may make use of the P-CPICH signal strength (RSCP) measurement results reported by Femto UE 2. However, in order to map the P-CPICH RSCP values into corresponding (downlink) path loss values, Femto NodeB/RNC 50,52 requires information of the transmitted P-CPICH power levels. There are a number of different ways to obtain this information. For example, if the Femto NodeB 50 is able to hear the neighboring Femto NodeB 40 during an initial NodeB scanning, the value of the P-CPICH transmission power can be read from the broadcast system information. If the Femto NodeB 50 is not able to read this information, the network has to assume a likely value for the neighboring Femto NodeB 40. For example, assuming that the received measurement reports indicate that the neighboring NodeB 40 is a Femto NodeB, the network can assume that the transmitted P-CPICH power is the same as for the serving Femto NodeB 50.

In sub-step 3, the maximum allowed Femto UE transmission power is estimated.

In the final sub-step 3 the network has to estimate the maximum allowed Femto UE transmission power so that the uplink interference level at the neighboring NodeB does not exceed a determined threshold. In the simplest form of implementation, the same uplink interference threshold is applied to all neighbor NodeBs. However, depending on the receiver sensitivity of a particular neighboring NodeB, a certain received interference power can have a different impact on the uplink performance. Typically, a macro NodeB with good receiver sensitivity is much more sensitive to any additional uplink interference compared to a Femto NodeB with worse receiver sensitivity. In order to take also this aspect into account, the network could estimate the uplink sensitivity degradation caused by Femto UE 2 at neighboring NodeB 40 instead of the plain uplink interference power. In order to calculate the sensitivity degradation, knowledge of the neighboring NodeB 40 receiver sensitivity is required. In addition to the (unloaded) receiver sensitivity, this information may be, for example, also be an indication of the typical receiver noise figure or uplink interference level of the neighboring NodeB 40.

There are some alternatives to obtain the receiver sensitivity or the receiver noise figure. However, this information is normally vendor specific and not publicly known and only revealed as a commercial secret. Some possible ways to obtain an estimate of the receiver sensitivity, noise figure, or RSSI of the neighboring NodeB are listed below.

Different types of NodeBs typically operate with different transmission power. The used transmission power is broadcasted and may be read by the Femto NodeB. One way would be to assume that a certain range of transmission power typically is used by a specific type of NodeB, for example a macro NodeB and then assume a typical/average receiver sensitivity for that type of NodeB.

Another way would be that the operator maintains a (logical) database, where, for example, Location Areas/cell IDs, i.e. the unique long cell identity that the Femto NodeB can read from the broadcasted system information, and the receiver sensitivity for the Femto or macro NodeB serving the cell is stored. Then, the information about receiver sensitivity is provided to the Femto NodeB 50 when it reports the detected femto cell during its scanning. The (logical) database could also be located in the Femto NodeB 50.

Still another way could be to allocate a range of PSCs to macro NodeBs, another range to micro NodeBs etc. Then the Femto NodeB would need to have the logic to assume/associate a certain receiver sensitivity with a certain PSC. However, rearranging the PSCs used in an existing network could be problematic.

Finally, if the serving Femto NodeB 50 is able to hear the neighboring NodeB, for example the Femto NodeB 40 during initial NodeB scanning, it can read the "uplink interference" value from the broadcast system information. The "uplink interference" indicates the total uplink interference power, for example, the sum of thermal noise, received signal powers from UEs and/or other background interference, measured by the Femto NodeB 40. Although the "uplink interference" does not directly indicate the receiver sensitivity, it can be seen to be a sufficient input for a rough estimate of the sensitivity degradation.

In step S6, the UE transmission power can be controlled in a number of ways, two main alternatives are shown. The regulation continues as the Femto UE 2 is moving and measurement reports are acted on, i.e. the steps S4-S6 are repeated.

In step 6A, the Femto UE 2 is informed by providing power offset to use in HSUPA access grants. This requires interaction between layer 3, where measurement reports are received, and layer 2 where access grants are processed.

In step 6B, the Femto UE 2 is informed with a Radio Resource Control, RRC, message "Physical channel reconfiguration", which the Femto UE 2 acknowledges with a "Physical channel reconfiguration complete" message.

In step S7, the Femto UE 2 session continues, but with a different UE transmission power, and interference towards the femto cell 10 can be regulated. Based on the received measurement reports from Femto UE 2 (step S4), the interference situation is monitored, and regulation actions are taken when necessary (step S5 and step S6). The continuous monitoring is achieved for example by ordering the affected Femto UE 2 to switch to periodic measurement reporting scheme instead of the event-triggered reporting. When the Femto UE 2 is judged to be sufficiently far away from the cell border (or when the uplink interference is judged to be sufficiently low) so that no additional UE transmission power limitations are required, the network can order the Femto UE 2 to switch back to event-triggered measurement reporting.

As mentioned, this is valid for other radio technologies as well.

Figure 4:
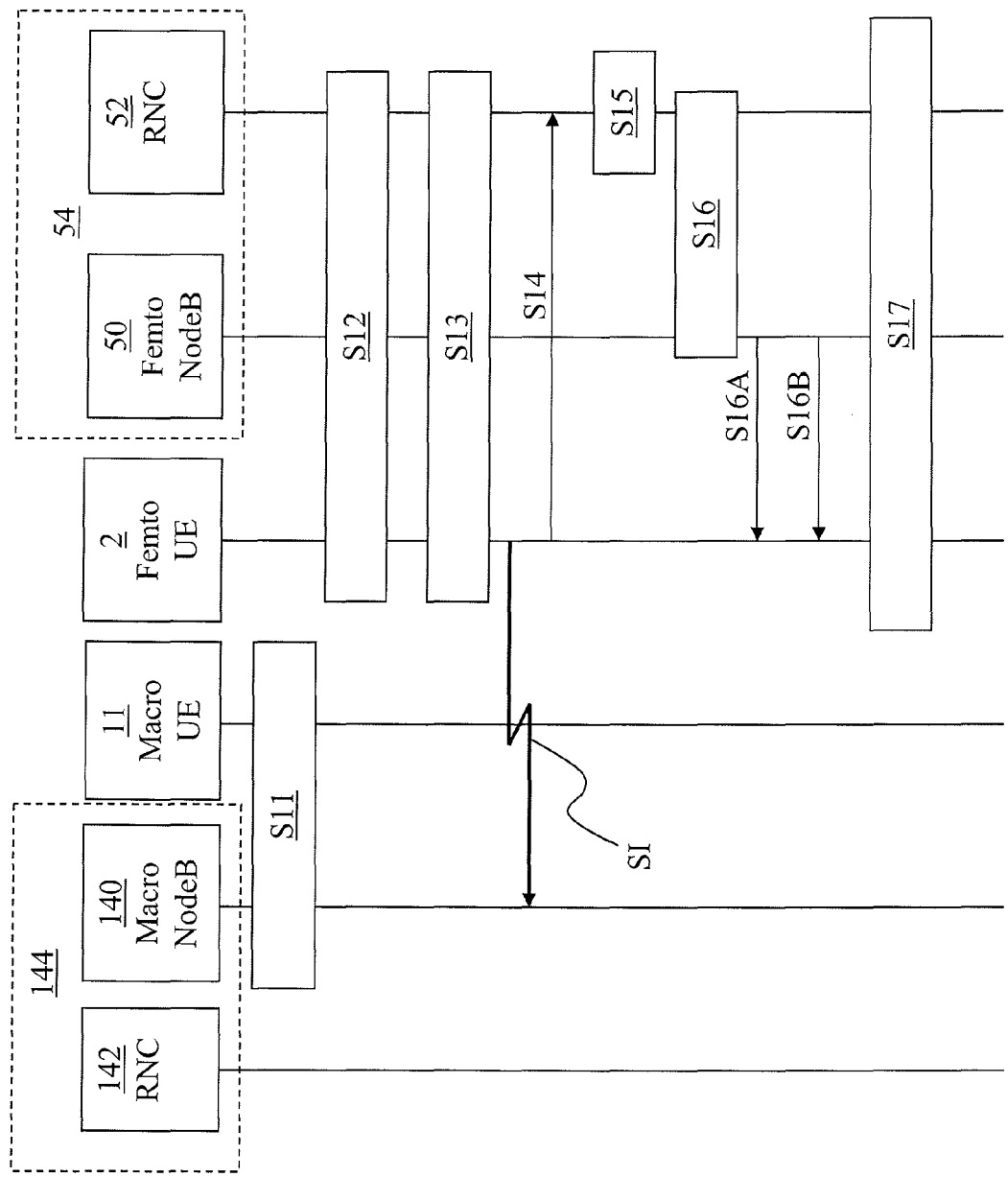
FIG. 4 shows a schematic combined signal and method diagram of a Femto UE and a Macro UE.

In FIG. 4, a schematic signal and method diagram of a Femto UE 2 interfering a macro cell 20 in a system according to FIG. 2 is shown.

In step S11, s macro UE 11 is engaged in session in the macro cell 20 of a Macro NodeB 140 on frequency 1.

In step S12, the Femto UE 2 is engaged in session in a femto cell 30 of a Femto NodeB 50 on frequency 1 with PSC 400.

In step S13, the Femto UE 2 gets close to the cell border of the femto cell 30 toward the macro cell 20 and uplink interference SI is a fact as the Femto UE 2 increases the transmission power.

In step S14, the Femto UE 2 sends a measurement report for the macro cell 20 to a Femto NodeB 50. It should here be noted that the Femto NodeB 50 and RNC 52 may be a combined Femto access point 54 comprising a base station and a controller unit. The same is illustrated for macro cell 20 with a combined macro NodeB 140 and RNC 142, denoted as 144.

In step S15, the Femto RNC 52 receives the measurement report from the Femto UE 2 and notices that the Femto UE 2 is close to a cell being a macro cell 20. The femto RNC 52 thus knows that the reported cell is a macro cell and that it is not possible to perform soft handover to the macro cell.

In step S15, following sub-steps may be performed; identify a Femto UE that should be regulated, e.g. Femto UE 2, estimate a level of uplink interference caused by Femto UE 2 towards the Macro NodeB 140, and estimate a maximum allowed Femto UE transmission power so that the estimated uplink interference at macro NodeB 140 will not exceed a maximum allowed level of interference.

In sub-step 1, the Femto UE 2 is identified to be a UE that should be power regulated.

When the uplink interference towards other cells is considered, the largest contribution comes from the Femto UEs that are close to the (uplink) cell border. Although the regular UE measurements (P-CPICH RSCP and/or Ec/N0) indicate the location of the (downlink) cell border, this information may be seen as sufficient also for selecting the Femto UEs that need to be regulated in the uplink.

Hence, Femto NodeB/RNC 50,52 may decide to regulate only UEs that report the relative P-CPICH RSCP (RSCPserving/RSCPneighbor) or Ec/N0 to be smaller than a certain threshold D2. Since the impact of additional uplink interference may depend on the type of the NodeB, a different thresholds can be applied depending on the type of the neighboring NodeB. Hence, threshold D1 may have a different value than threshold D2.

In sub-step 2, the level of uplink interference at the neighboring Macro NodeB 140 is estimated.

In order to estimate the level of interference at the Macro NodeB 140, Femto NodeB 50 needs to obtain an estimate of the (uplink) path loss from the Femto UE 2 towards Macro NodeB 140. Again, Femto NodeB/RNC 50,52 may make use of the P-CPICH signal strength (RSCP) measurement results reported by Femto UE 2. However, in order to map the P-CPICH RSCP values into corresponding (downlink) path loss values, Femto NodeB/RNC2 50,52 requires information of the transmitted P-CPICH power levels. There are a number of different ways to obtain this information. For example, if the Femto NodeB 50 is able to hear the Macro NodeB 140 during an initial NodeB scanning, the value of the P-CPICH transmission power can be read from the broadcast system information. If the Femto NodeB 50 is not able to read this information, the network has to assume a likely value for the Macro NodeB 140. For example, assuming that the NodeB 140 is a Macro NodeB, the network can assume that the transmitted P-CPICH power is according to a preset value for a Macro NodeB.

In sub-step 3, the maximum allowed Femto UE transmission power is estimated.

In the final sub-step the network has to estimate the maximum allowed Femto UE transmission power so that the wanted uplink interference level does not exceed the wanted threshold. In the simplest form of implementation, the same uplink interference threshold is applied to all neighbor NodeBs. However, depending on the receiver sensitivity of a particular neighboring NodeB, a certain received interference power can have a different impact on the uplink performance. Typically, a macro NodeB with good receiver sensitivity is much more sensitive to any additional uplink interference compared to a Femto NodeB with worse receiver sensitivity. In order to take also this aspect into account, the network could estimate the uplink sensitivity degradation caused by the Femto UE 2 at Macro NodeB 140 instead of the plain uplink interference power. In order to calculate the sensitivity degradation, knowledge of the Macro NodeB 140 receiver sensitivity is required. In addition to the (unloaded) receiver sensitivity, this information may be, for example, also be an indication of the typical receiver noise figure or uplink interference level of the Macro NodeB 140.

There are some alternatives to obtain the (unloaded) receiver sensitivity or the receiver noise figure as stated in reference to FIG. 3. However, in this case the neighboring NodeB is Macro NodeB 140 instead of Femto NodeB 40.

In step S16, the Femto UE transmission power can be controlled in a number of ways, two main alternatives are shown. The regulation continues as the Femto UE 2 is moving and measurement reports are acted on, i.e. the steps S14-S16 are repeated.

In step S16A, the Femto UE 2 is informed by providing power offset to use in HSUPA access grants. This requires interaction between layer 3, where measurement reports are received, and layer 2 where access grants are processed.

In step S16B, the Femto UE 2 is informed with a Radio Resource Control, RRC, message "Physical channel reconfiguration", which the Femto UE acknowledges with a "Physical channel reconfiguration complete" message.

In step S17, the Femto UE 2 session continues but with a different UE transmission power, and interference towards the macro cell 20 may be regulated. Based on the received measurement reports from Femto UE 2 (step S14), the interference situation is monitored, and regulation actions are taken when necessary (step S15 and step S16). The continuous monitoring is achieved, for example, by ordering the affected Femto UE 2 to switch to periodic measurement reporting scheme instead of the event-triggered reporting. When the Femto UE 2 is judged to be sufficiently far away from the cell border (or when the uplink interference is judged to be sufficiently low) so that no additional UE transmission power limitations are required, the network can order the Femto UE 2 to switch back to event-triggered measurement reporting.

Figure 5:
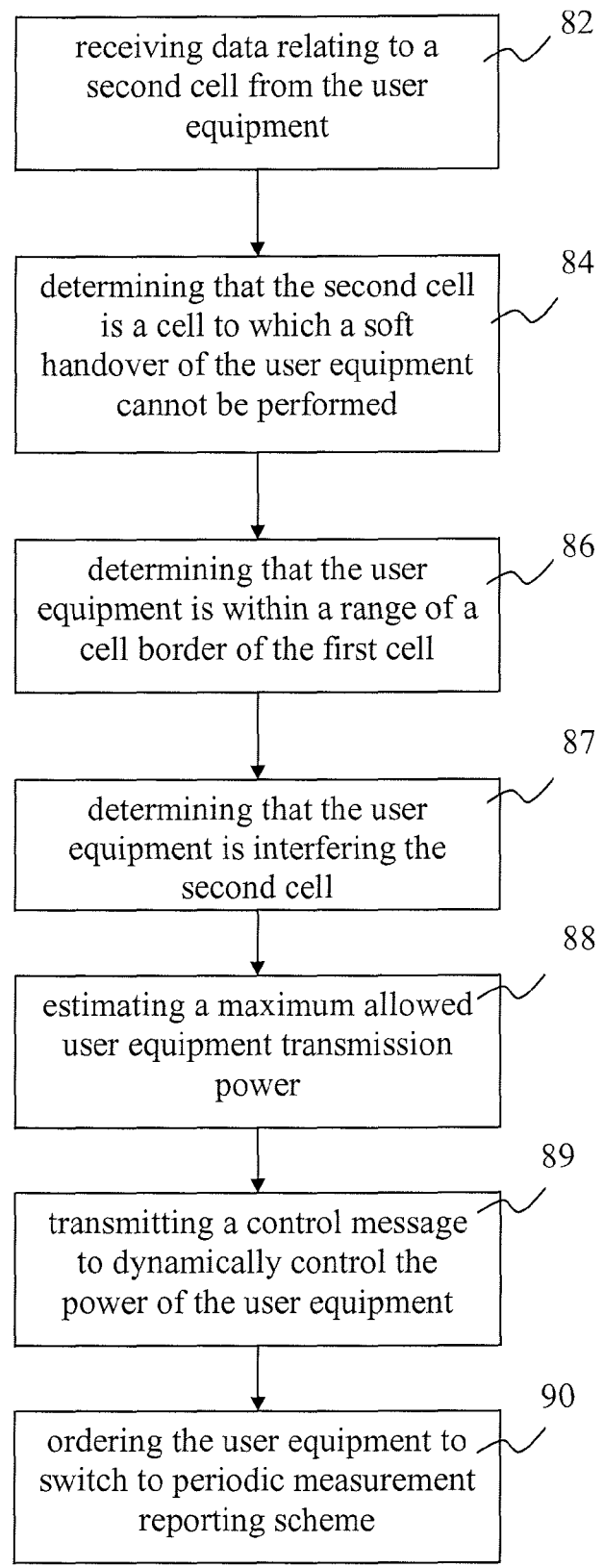
FIG. 5 shows a schematic flow chart of a method in a first communication device.

In FIG. 5, a schematic flow chart of a method in a first communication device for controlling power transmission of a user equipment is shown.

In step 82, the first communication device receives data relating to a second cell from the user equipment. The data may be a measurement report of a signal from the second cell or the like.

In step 84, the first communication device determines that the second cell is a cell to which a soft handover of the user equipment cannot be performed. For example, by comparing the received PSC to a list indicating PSC to which no soft handover is allowed.

In step 86, the first communication device further determines that the user equipment is within a range of a cell border of the first cell.

In some embodiments, the range corresponds to a preset value D of received signal code power for the primary common pilot channel or a preset received energy per chip on primary common pilot channel and the preset value is compared to a reported received signal code power for the primary common pilot channel or a reported received energy per chip on primary common pilot channel from the user equipment. Hence, either RSCPserving/RSCPneighbor<D or Ec/N0serving/Ec/N0neighbor<D. D being the preset threshold value It should be understood that the threshold value D may be based on the type of the second cell, such as a Femto cell, Macro cell or the like.

The threshold value D may, in some embodiments, be based on the type of service of the user equipment.

In optional step 87, the first communication device furthermore determines that the user equipment is interfering the second cell. This may be done by estimating a level of uplink interference generated by the user equipment at the second cell and comparing it to a threshold value or the like.

In some embodiments, the threshold value comprises a preset received signal code power for the primary common pilot channel or a preset received energy per chip on primary common pilot channel compared to primary common pilot channel transmission power and the threshold value is compared to a reported received signal code power for the primary common pilot channel from the user equipment or a reported received energy per chip on primary common pilot channel.

It should be understood that the threshold value may be based on the type of the second cell, such as a Femto cell, Macro cell or the like.

The threshold value may, in some embodiments, be based on the type of service of the user equipment.

In some embodiments, the level of uplink interference is based on an estimation of uplink path loss from the user equipment towards a base station of the second cell.

In optional step 88, the first communication device estimates a maximum allowed user equipment transmission power so that the uplink interference level does not pass the threshold value. Depending of the way to calculate the uplink interference level, the threshold value should not be exceeded or the calculated uplink interference level should not go below the threshold value.

In some embodiments, the uplink interference may be based on an estimation of uplink sensitivity degradation from the user equipment towards a base station of the second cell. The estimation of uplink sensitivity degradation takes into account a receiver sensitivity of the base station.

The receiver sensitivity of the base station may be obtained by identifying/analyzing signals from the base station or by estimating/approximating/guessing the receiver sensitivity.

In step 89, the first communication device transmits a control message to the user equipment, thereby, controlling the transmission power of the user equipment.

The control message may comprise data to reduce the transmission power of the user equipment in order to reduce the interference toward the second cell.

In optional step 90, continuous monitoring is achieved by ordering the user equipment to switch to periodic measurement reporting scheme instead of the event-triggered reporting.

It should be understood that when the user equipment is judged to be sufficiently far away from the cell border, the first communication device may order the user equipment to switch back to event-triggered measurement reporting.

In order to perform the method mentioned above a first communication device is provided.

The first communication device may be a may be a base station, such as radio base station, RBS, Base Transceiver Station, BTS, Node B, Evolved Node B or the like, a base station controller, such as a radio network controller, RNC, base transceiver controller, or the like, or a combination thereof.

Figure 6:
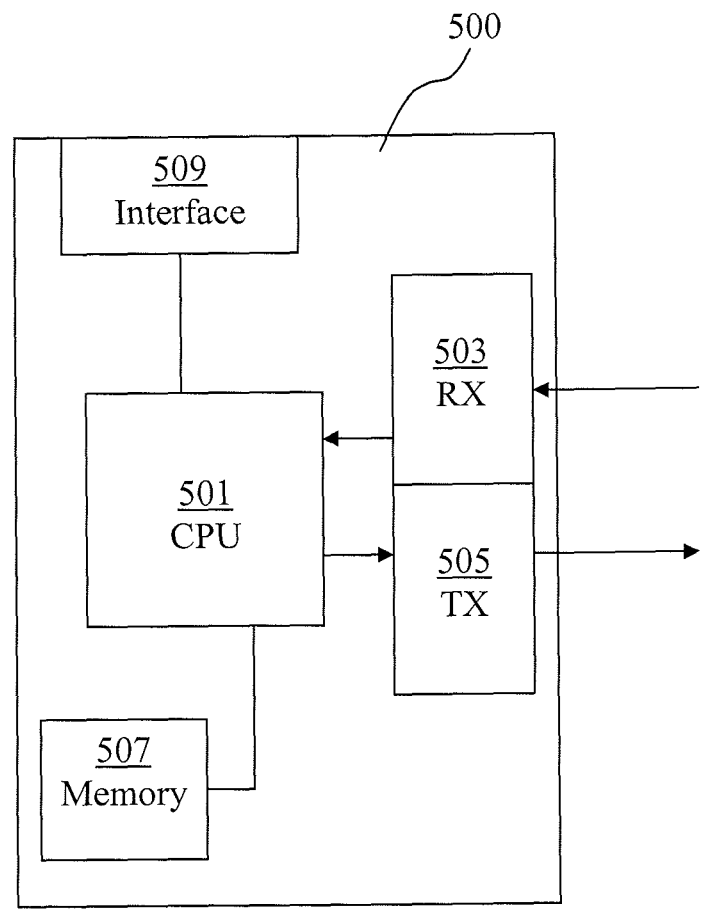
FIG. 6 shows a schematic overview of a first communication device.

In FIG. 6, a schematic overview of a first communication device 500 arranged to serve a first cell of a first frequency is shown. The first communication device 500 comprises a receiving arrangement 503 adapted to receive data relating to a second cell of the first frequency from a user equipment. The data may in some embodiments comprise a measurement report of signals from the second cell performed at the user equipment.

The first communication device 500 further comprises a control unit 501 arranged to determine to power regulate the user equipment based on predetermined requirements. The predetermined requirement being that the second cell is a cell to which a soft handover cannot be performed, and that the user equipment is within a range of a cell border of the first cell. And if the predetermined requirements are fulfilled, the control unit 501 is further arranged to generate a control message to control the transmission power of the user equipment.

The range may in some embodiments correspond to a preset value of received signal code power for the primary common pilot channel or a preset received energy per chip on primary common pilot channel and the preset value is compared to a reported received signal code power for the primary common pilot channel or a reported received energy per chip on primary common pilot channel from the user equipment.

The preset value may be based on the type of the second cell (such as a Femto cell, Macro cell or the like), and/or the type of service of the user equipment.

The predetermined determination requirements may further, in some embodiments, comprise to determine whether the user equipment is interfering the second cell by estimating a level of uplink interference generated by the user equipment at the second cell and the control unit 501 is further arranged to compare it to a threshold value.

It should be noted that the threshold value, in some embodiments, may comprise a preset received signal code power for the primary common pilot channel or a preset received energy per chip on primary common pilot channel compared to primary common pilot channel transmission power. The threshold value may then be compared to a reported received signal code power for the primary common pilot channel from the user equipment or a reported received energy per chip on primary common pilot channel wherein the comparison is performed by the control unit 501.

The threshold value may be based on the type of the second cell (such as a Femto cell, Macro cell or the like), and/or the type of service of the user equipment.

In some embodiments, the control unit 501 may be arranged to perform an estimation of uplink path loss from the user equipment towards a base station of the second cell and the level of uplink interference is based on the estimation.

The control unit 501 may in some embodiments further be arranged to estimate a maximum allowed user equipment transmission power so that the level of uplink interference does not pass the threshold value. Depending of the way to calculate the uplink interference, the threshold value should not be exceeded or the calculated uplink interference level should not go below the threshold value.

The control unit 501 may, furthermore, be arranged to perform an estimation of uplink sensitivity degradation from the user equipment towards a base station of the second cell, the estimation of uplink sensitivity degradation takes into account a receiver sensitivity of the base station and the level of uplink interference is based on the estimation.

The control unit 501 may, in some embodiments, be arranged to identify/analyse signals from the base station over the receiving arrangement 503 to obtain receiver sensitivity of the base station or by estimating/approximating/guessing the receiver sensitivity.

Furthermore, the first communication device 500 comprises a transmitting arrangement 505 adapted to transmit the control message to the user equipment.

The control message may in some embodiments comprise data to reduce the transmission power of the user equipment in order to avoid interference towards the second cell.

In some embodiments, the control unit 501 may be arranged to order the user equipment to a periodic measurement reporting scheme to continuously monitor the interference by transmitting an order over the transmitting arrangement 505 to the user equipment.

It should be understood that the control unit 501 may be arranged to judge whether the user equipment is sufficiently far away from the cell border, the first communication device 500 may order the user equipment to switch back to event-triggered measurement reporting. Sufficiently may be determined to be when no interference is present towards the second cell.

It should also be understood that the receiving and transmitting arrangements 503, 505 in the communication device may be separated devices or arranged as a combined device, such as a transceiving unit or the like. The control unit may be one or more general purpose processors, special purpose processors, ASICs, and/or other programmable data processing apparatus.

The first communication device 500 may further comprise a transmitting interface 509 arranged to communicate with a core network device, such as a controller or the like, and, in some embodiments, the first communication device 500 may further comprise a memory 507 wherein application may be stored to perform the method and/or data relating to different cells. The memory 507 may comprise a single or a plurality of memory devices.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a radio base station or a radio base station controller serving a first cell of a first frequency for controlling a transmission power of a user equipment (UE) in the first cell, comprising:
   receiving, from the UE, data relating to a second cell of the first frequency;
   determining to power regulate the UE based on:
      determining that the second cell is a cell to which a soft handover cannot be performed based on the data, and
      determining that the UE is within a range of a cell border of the first cell; and
   if it is determined to power regulate the UE, transmitting a control message to the UE to control the transmission power of the UE.

2. The method of claim 1, wherein the range corresponds to a preset value of received signal code power for a primary common pilot channel or a preset received energy per chip on the primary common pilot channel, and the preset value is compared to a reported received signal code power for the primary common pilot channel or a reported received energy per chip on the primary common pilot channel from the UE to determine whether the UE is within the range of the cell border of the first cell.

3. The method of claim 2, wherein the preset value is based on at least one of a type of the second cell and a type of service of the UE.

4. The method of claims 1, wherein determining to power regulate the UE further comprises determining that the UE is interfering in the second cell by estimating a level of uplink interference generated by the UE at the second cell and comparing the estimated level to a threshold value.

5. The method of claim 4, wherein the threshold value comprises a preset received signal code power for a primary common pilot channel or a preset received energy per chip on the primary common pilot channel compared to a primary common pilot channel transmission power, and the threshold value is compared to a reported received signal code power for the primary common pilot channel from the UE or a reported received energy per chip on the primary common pilot channel from the UE.

6. The method of claim 4, wherein the threshold value is based on at least one of a type of the second cell and a type of service of the UE.

7. The method of claim 4, wherein the level of uplink interference is based on an estimate of uplink path loss from the UE toward a base station of the second cell.

8. The method of claim 4, further comprising estimating a maximum allowed UE transmission power such that the level of uplink interference does not pass the threshold value.

9. The method of claim 8, wherein the level of uplink interference is based on an estimate of uplink sensitivity degradation from the UE toward a base station of the second cell, and the estimate of uplink sensitivity degradation takes into account a receiver sensitivity of the base station.

10. The method of claim 9, wherein the receiver sensitivity of the base station is generated based on signals from the base station or by estimating the receiver sensitivity.

11. The method of claim 1, wherein the control message comprises data to reduce the transmission power of the UE.

12. The method of claim 1, further comprising ordering the UE to report periodic measurements to continuously monitor interference.

13. An apparatus in a radio base station or a radio base station controller arranged to serve a first cell of a first frequency, comprising:
   a receiver adapted to receive data relating to a second cell of the first frequency from a user equipment (UE);
   a control unit arranged to determine to power regulate the UE based on whether the second cell is a cell to which a soft handover cannot be performed based on the data and the UE is within a range of a cell border of the first cell, and in that case, to generate a control message to control a transmission power of the UE; and
   a transmitter adapted to transmit the control message to the UE.

14. The apparatus of claim 13, wherein the range corresponds to a preset value of received signal code power for a primary common pilot channel or a preset received energy per chip on the primary common pilot channel, and the preset value is compared to a reported received signal code power for the primary common pilot channel or a reported received energy per chip on the primary common pilot channel from the UE to determine whether the UE is within the range of the cell border of the first cell.

15. The apparatus of claim 14, wherein the preset value of the range is based on at least one of a type of the second cell and a type of service of the UE.

16. The apparatus of claim 13, wherein the control unit is arranged to determine to power regulate the UE based on that the UE is interfering in the second cell by estimating a level of uplink interference generated by the UE at the second cell and comparing the estimated level to a threshold value.

17. The apparatus of claim 16, wherein the threshold value comprises a preset received signal code power for the primary common pilot channel or a preset received energy per chip on the primary common pilot channel compared to primary common pilot channel transmission power, and the control unit is arranged to compare the threshold value to a reported received signal code power for the primary common pilot channel from the UE or a reported received energy per chip on the primary common pilot channel.

18. The apparatus of claim 16, wherein the threshold value is based on at least one of a type of the second cell and a type of service of the UE.

19. The apparatus of claim 16, wherein the control unit is arranged to estimate an uplink path loss from the UE toward a base station of the second cell, and the level of uplink interference is based on the uplink path loss estimate.

20. The apparatus of claim 16, wherein the control unit is arranged to estimate a maximum allowed UE transmission power such that the level of uplink interference does not pass the threshold value.

21. The apparatus of claim 20, wherein the control unit is arranged to estimate uplink sensitivity degradation from the UE toward a base station of the second cell, taking into account a receiver sensitivity of the base station, and the level of uplink interference is based on the uplink sensitivity degradation estimate.

22. The apparatus of claim 21, wherein the control unit is arranged to obtain a receiver sensitivity of the base station based on signals received from the base station or on an estimate of the receiver sensitivity.

23. The apparatus of claim 13, wherein the control message comprises data to reduce the transmission power of the UE.

24. The apparatus of claim 13, wherein the control unit is further arranged to order the UE to report periodic measurements to continuously monitor interference by transmitting an order to the UE via the transmitter.

* * * * *